United States Patent
Domingues

(10) Patent No.: US 10,182,577 B2
(45) Date of Patent: *Jan. 22, 2019

(54) REFRIGERATED, CHEMICALLY LEAVENED DOUGHS IN PACKAGE, WITH CARBON DIOXIDE ATMOSPHERE

(71) Applicant: General Mills, Inc., Minneapolis, MN (US)

(72) Inventor: David J Domingues, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,494

(22) Filed: Nov. 16, 2017

(65) Prior Publication Data

US 2018/0070597 A1    Mar. 15, 2018

Related U.S. Application Data

(63) Continuation of application No. 15/097,770, filed on Apr. 13, 2016, now Pat. No. 9,848,609, which is a continuation of application No. 11/577,885, filed as application No. PCT/US2005/039188 on Oct. 28, 2005, now Pat. No. 9,314,033.

(60) Provisional application No. 60/623,428, filed on Oct. 29, 2004.

(51) Int. Cl.

| | |
|---|---|
| *A21D 10/02* | (2006.01) |
| *A21D 6/00* | (2006.01) |
| *A21D 8/04* | (2006.01) |
| *B65B 25/00* | (2006.01) |
| *A21D 4/00* | (2006.01) |
| *B65B 25/16* | (2006.01) |
| *B65B 31/00* | (2006.01) |
| *B65D 81/28* | (2006.01) |

(52) U.S. Cl.
CPC .............. *A21D 10/025* (2013.01); *A21D 4/00* (2013.01); *A21D 6/001* (2013.01); *A21D 8/042* (2013.01); *A21D 8/045* (2013.01); *B65B 25/001* (2013.01); *B65B 25/16* (2013.01); *B65B 31/00* (2013.01); *B65D 81/28* (2013.01)

(58) Field of Classification Search
CPC ...... A21D 10/025; A21D 6/001; A21D 8/042; A21D 4/00; A21D 8/045; B65B 25/001; B65B 25/16; B65B 31/00; B65D 81/28
See application file for complete search history.

(56) References Cited

U.S. PATENT DOCUMENTS

| | | |
|---|---|---|
| 2,783,150 A | 2/1957 | Luther |
| 4,996,062 A | 2/1991 | Lehtonen et al. |
| 5,356,800 A | 10/1994 | Jaquess |
| 5,366,744 A | 11/1994 | Drummond et al. |
| 5,547,690 A | 8/1996 | Vaisanen et al. |
| 5,672,369 A | 9/1997 | Lonergan et al. |
| 5,698,245 A | 12/1997 | Tanaka et al. |
| 6,242,024 B1 | 6/2001 | Perry et al. |
| 6,602,529 B1 | 8/2003 | Lonergan et al. |
| 6,635,291 B2 | 10/2003 | Perry et al. |
| 7,235,274 B2 | 6/2007 | Archibald et al. |
| 7,250,187 B2 | 7/2007 | Domingues |
| 2001/0002270 A1 | 5/2001 | Perry et al. |
| 2003/0003213 A1 | 1/2003 | Drantch et al. |
| 2003/0049358 A1 | 3/2003 | Domingues |
| 2003/0138540 A1 | 7/2003 | Braginsky et al. |
| 2004/0076722 A1 | 4/2004 | Archibald et al. |
| 2004/0241283 A1 | 12/2004 | Domingues et al. |
| 2004/0241290 A1 | 12/2004 | El-Afandi |
| 2004/0241292 A1 | 12/2004 | Geng et al. |
| 2005/0271773 A1 | 12/2005 | Domingues |

FOREIGN PATENT DOCUMENTS

| | | |
|---|---|---|
| EP | 469654 | 6/1991 |
| JP | 1033109 | 2/1998 |
| JP | 2000300158 | 10/2000 |
| JP | 2001211814 | 8/2001 |
| WO | WO 2002035936 | 5/2002 |

OTHER PUBLICATIONS

Whitaker, "Principles of Enzymology for the Food Sciences", Second Edition, Chapters 21-27 (1994).

*Primary Examiner* — Erik Kashnikow
*Assistant Examiner* — Chaim A Smith
(74) *Attorney, Agent, or Firm* — Diederiks & Whitelaw, PLC.; John L. Crimmins, Esq.

(57) ABSTRACT

Described are methods and compositions relating to dough compositions leavened by chemical leavening systems that include acidic chemical leavening agent and encapsulated basic chemical leavening agent, wherein the dough composition can be refrigerated in a low pressure package that contains a carbon dioxide atmosphere.

22 Claims, No Drawings

REFRIGERATED, CHEMICALLY LEAVENED DOUGHS IN PACKAGE, WITH CARBON DIOXIDE ATMOSPHERE

REFERENCE TO RELATED APPLICATION

This application represents a continuation of application Ser. No. 15/097,770, filed Apr. 13, 2016, which is a continuation of application Ser. No. 11/577,885, filed Apr. 25, 2007, now U.S. Pat. No. 9,314,033, which is a National Stage of Application No. PCT/US2005/039188, filed Oct. 28, 2005, which claims the benefit of priority under 35 U.S.C. § 119(e)(1) of a provisional patent application, Ser. No. 60/623,428, filed Oct. 29, 2004, which are incorporated herein by reference in their entirety.

FIELD OF THE INVENTION

The invention relates to refrigerator-stable, chemically-leavened, dough compositions, dough products, and methods for preparing the same.

BACKGROUND

Today's commercial and consumer dough products are designed to accommodate consumer preferences in terms of convenience of use, storage stability, and organoleptic properties such as taste, texture, aroma, and color. One popular type of consumer dough product is the class of refrigerator-stable, chemically-leavened, dough products, a single example being refrigerated soda biscuits. These dough products are leavened substantially by the action of chemical leavening agents, as opposed to yeast, and they can be packaged to be stable over certain periods of time at refrigerated conditions.

Consumers appreciate the convenience of refrigerator-stable dough compositions, e.g., because of the convenience of allowing a refrigerated dough to be prepared, stored, and used at a convenient time. Refrigerated doughs should desirably produce a cooked dough product having properties comparable to cooked doughs prepared without an extended period of refrigerated storage, such as desired taste, aroma, texture, leavening properties, and color.

A key consideration in the feasibility of a commercial dough product is whether a storage-stable dough product can be prepared and packaged in an economical manner. Whether this is possible can depend on factors such as a packaging configuration and packaging materials. Packaging of a refrigerator-stable dough product can contribute to retaining freshness over an extended period of refrigerated storage. Many types of packaging materials and package forms are used commercially, including pressurized cans and non-pressurized pouches or chubs.

SUMMARY

The invention relates to raw, chemically-leavened (i.e., chemically-leavenable) dough compositions, packaged dough products, and related methods. The doughs include a chemical leavening system that includes a basic chemical leavening agent and acidic chemical leavening agent, and can be packaged in a low pressure package having a carbon dioxide atmosphere, for refrigerated storage.

Past attempts to improve stability of dough compositions during refrigerated storage have involved a reduction or elimination of package headspace, with the use of vacuum. According to these methods, it can be preferred to have the dough composition frozen when vacuum is applied, to prevent damage to the dough. The step of freezing the dough, however, adds cost and complication to the process.

According to the invention, refrigerator-stable dough compositions can be packaged in low pressure packaging, without having to be frozen while subjected to vacuum, with the resultant packaged dough still exhibiting desired refrigerated storage stability. This can be accomplished, based on the invention, by using a headspace that includes an added carbon dioxide atmosphere (without freezing the dough, or eliminating headspace), and with the use of an amount of headspace and carbon dioxide atmosphere that does not exceed 0.5 cubic centimeters headspace per gram dough, e.g., from 0.1 to 0.5 cubic centimeters headspace per gram of dough.

A low pressure package can mean a package that is substantially air tight, with an internal pressure that, typically, is about 1 atmosphere or 15 psia (pounds per square inch, absolute), or slightly greater. Examples of low pressure packages include chubs and pouches that do not exhibit a pressurized interior. Low pressure packages specifically exclude pressurized cans and canisters, e.g., of cardboard, that contain dough products at an internal pressure of at least 15 psig.

According to the invention, a raw, chemically leavenable dough composition is packaged in a carbon dioxide atmosphere, with the amount of carbon dioxide being based on the amount of dough in a package. Headspace refers to the amount of volume of the packaged dough product not taken up by dough composition; i.e., the internal volume not taken up by the dough product. (Headspace does not include potential space not used but available in the form of wrinkled or folded packaging material.) The headspace of a packaged dough composition, and the volume of carbon dioxide atmosphere, can be up to 0.5 cubic centimeters headspace and carbon dioxide atmosphere per gram of dough contained in the package. A carbon dioxide atmosphere refers to a substantially concentrated carbon dioxide atmosphere, including a gaseous atmosphere that contains at least 90 percent carbon dioxide, e.g., at least 95 or 99 percent carbon dioxide.

Specific embodiments of the invention include, but are not limited by, un-proofed, non-developed doughs in a low pressure package, e.g., biscuit doughs, that contains chemical leavening agent including an encapsulated basic chemical leavening agent, a relatively low solubility acidic chemical leavening agent, and glucose oxidase.

Exemplary dough compositions packaged according to the invention can evolve less than 80 cubic centimeters (cc) of carbon dioxide per 125 grams of dough over an 8, 10, or 12 week period of time while stored at 45 degrees Fahrenheit, e.g., from 60 to 80 cc of carbon dioxide per 125 grams over 8, 10, or 12 weeks at 45° F. Such a dough can undergo a desired amount of leavening during such period of refrigerated storage, to produce a dough composition having a raw specific volume in the range from 0.9 to 1.6 cc/gram.

Upon baking, exemplary non-developed dough compositions of the invention can exhibit leavening and baked specific volume properties that are typical of normal non-developed doughs, e.g., can be baked to a specific volume of at least 2 or 2.5 cc/g, e.g., from 2.5 to 3.4 cc/g.

As used in the present description, the terms "proof" and "proofing" relate to an occurrence prior to baking of a dough composition that entails at least partial expansion (i.e., at least partial proofing) of a dough composition resulting from the reaction of chemical leavening agents or from the metabolic action of yeast to evolve $CO_2$ gas that expand bubbles within the dough composition and thereby expand the dough composition to a desired volume and optionally to a desired shape.

In one aspect, the invention relates to a refrigerated dough product that includes a raw, chemically-leavened dough composition in a low pressure package. The dough composition includes encapsulated basic chemical leavening agent, acidic chemical leavening agent, and glucose oxidase. The packaging containing headspace containing a carbon dioxide atmosphere. And, the ratio of carbon dioxide volume to dough mass, upon packaging, is less than or equal to 0.5 cubic centimeters per gram.

In another aspect the invention relates to a method of providing a dough product. The method includes providing a non-frozen, raw, chemically-leavened dough composition; placing the non-frozen dough composition in a low pressure package, the package having a ratio of headspace volume to dough mass of no greater than 0.5 cubic centimeters headspace per gram; flushing the headspace with carbon dioxide; sealing the package to contain the dough composition in a carbon dioxide headspace; storing the dough composition at a refrigerated storage temperature; and cooking (e.g., baking) the dough composition.

DETAILED DESCRIPTION

Dough compositions according to the invention include chemically-leavened dough compositions (i.e., "chemically-leavenable" dough compositions), which are dough compositions that leaven to a substantial extent by the action of chemical ingredients that react to produce a leavening gas. Typically, the ingredients include a basic chemical leavening agent and an acidic chemical leavening agent, the two of which react to produce carbon dioxide that, when retained by the dough matrix, causes the dough to expand. Chemically-leavened doughs can be contrasted to dough formulations that are substantially leavened due to the action of yeast as a leavening agent, i.e., by metabolic action of yeast on a substrate to produce carbon dioxide. While doughs of the invention can include yeast, e.g., as a flavoring agent, certain dough compositions of the invention do not include yeast as a leavening agent.

The degree of development of a dough (as in a "developed" versus a "non-developed" dough) generally refers to the strength of a dough's matrix, as the strength relates to the degree of development of gluten (protein) in a dough matrix. During processing of a dough composition, gluten can be caused or allowed to interact or react and "develop" a dough composition in a way that increases the stiffness, strength, and elasticity of the dough. Doughs commonly referred to as "developed" doughs are generally understood to include doughs that have a relatively highly-developed gluten matrix structure; a stiff, elastic rheology; and (due to the stiff, elastic matrix) are well able to form bubbles or cells that can stretch without breaking to hold a leavening gas while the dough expands, leavens, or rises, prior to or during cooking (e.g., baking). Features that are sometimes associated with a developed dough, in addition to a stiff, elastic rheology, include a sufficient (e.g., relatively high) protein content to allow for a highly-developed structure; optionally, processing steps that include time to allow the dough ingredients (e.g., gluten) to interact and "develop" to strengthen the dough; and on average a baked specific volume that is relatively higher than non-developed doughs. Oftentimes, developed doughs are yeast-leavened, but may be chemically leavened. Examples of specific types of doughs that can be considered to be developed doughs include doughs for pizza crust, breads (loaves, dinner rolls, baguettes, bread sticks), raised donuts, cinnamon rolls, croissants, Danishes, pretzels, etc.

As compared to "developed" doughs, doughs commonly referred to as non-developed (or "un-developed" or "under-developed") have a relatively less developed ("undeveloped") dough matrix that gives the dough a relatively less or reduced elastic rheology, reduced strength, and reduced gas-holding capacity. Being less elastic than a developed dough and exhibiting a reduced gas-holding capacity, non-developed doughs, on average, exhibit relatively lower raw and baked specific volumes.

Chemically-leavened, non-developed, dough compositions can be prepared from ingredients generally known in the dough and bread-making arts, typically including flour, a liquid component such as oil or water, a chemical leavening system, fat (solid or liquid), and optionally additional ingredients such as salt, sweeteners, dairy products, egg products, processing aids, emulsifiers, particulates, dough conditioners, yeast as a flavorant, other flavorings, and the like. Exemplary compositions do not include yeast as a leavening agent, and such doughs are leavened entirely based on the action of the chemical leavening agents.

Acidic chemical leavening agents are generally known in the dough and bread-making arts, with examples including sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dihydrate (DCPD), glucono-delta-lactone (GDL), as well as a variety of others. Commercially available acidic chemical leavening agents include those sold under the trade names: Levn-Lite® (SALP), Pan-O-Lite® (SALP+MCP), STABIL-9® (SALP+AMCP), PY-RAN® (AMCP), and HT® MCP (MCP). Optionally, an acidic chemical leavening agent for use according to the invention (either soluble or insoluble), can be encapsulated. According to certain specific embodiments of the invention, a chemically-leavenable dough includes non-encapsulated, acidic chemical leavening agent that is relatively insoluble in a liquid (e.g., aqueous) component of the dough composition, at a temperature used during processing (e.g., from 40 to about 72 degrees Fahrenheit) or refrigerated storage (e.g. from about 32 to about 55 degrees Fahrenheit). Particularly useful acidic chemical leavening agents that are considered to exhibit a relatively low solubility at processing temperature, include sodium aluminum phosphate (SALP), sodium acid pyrophosphate (SAPP) having a relatively low solubility, and other acidic chemical leavening agents that exhibit similar solubility behavior.

Acidic chemical leavening agent can be present in a dough composition in an amount that provides one or more useful properties as described herein, including refrigerated stability, desired refrigerated raw specific volume, and desired leavening properties during and following refrigerated storage. A typical amount of acidic agent such as SALP may be in the range from about 0.25 to about 2 parts by weight per 100 parts dough composition, with ranges from about 0.25 to about 1.5 parts by weight per 100 parts dough composition sometimes being particularly useful. These amounts, and amounts of acidic agent identified throughout the present application and claims, do not including encapsulating agent unless otherwise noted.

The dough composition also includes basic chemical leavening agent. Useful basic chemical leavening agents are generally known in the dough and baking arts, and include soda, i.e., sodium bicarbonate ($NaHCO_3$), potassium bicarbonate ($KHCO_3$), ammonium bicarbonate ($NH_4HCO_3$), etc.

These and similar types of basic chemical leavening agents are generally freely soluble in an aqueous component of a dough composition at processing and refrigerated storage temperatures.

The amount of basic chemical leavening agent used in a dough composition may be sufficient to react with the included acidic chemical leavening agent to release a desired amount of gas for leavening, thereby causing a desired degree of expansion of the dough product. The typical amount of a basic chemical leavening agent such as sodium bicarbonate may be in the range from about 0.2 or 0.25 to about 1.5 weight percent based on the total weight of a dough composition, including the range from about 0.75 to about 1.25 weight percent based on total weight of a dough composition. (As used throughout this description and claims, unless otherwise noted, amounts of basic chemical leavening agents and encapsulated basic chemical leavening agents are given in terms of the amount of active basic agent, not including the weight of any encapsulant or barrier material.)

According to specific embodiments of the invention, a basic agent can be encapsulated, and can be used in combination with a relatively low solubility acidic agent. Encapsulated basic chemical leavening agents are generally known, and can be prepared by methods known in the baking and encapsulation arts. An example of a method for producing enrobed particles is the use of a fluidized bed.

Encapsulated basic chemical leavening agents are typically particles that include solid basic chemical leavening agent particulates covered in part, e.g., substantially completely, by a barrier material or encapsulant. Encapsulated particles are known in the baking arts, and include encapsulated particles sometimes referred to as "enrobed" particles, as well as those sometimes referred to as "agglomerated" particles. The barrier material or encapsulant forms a coating or shell around a single or multiple particulates of solid basic chemical leavening agent, separating the chemical leavening agent from a bulk dough composition. "Enrobed" particles generally include a single particulate of chemical leavening agent covered or coated by barrier material, and "agglomerate" particles generally include 2, 3, or more particulates of chemical leavening agent contained in a mass of barrier material.

Encapsulating the basic chemical leavening agent provides separation between the basic chemical leavening agent and the bulk of the dough composition to inhibit, prevent, or slow the progress of reaction of the basic and acidic leavening agents. On the other hand, due to cracks, incomplete coverage, or damage to encapsulated particles, some amount of basic agent can be exposed, allowing it to dissolve into a dough composition, contact dissolved acid, and react to produce carbon dioxide. Due to such imperfect encapsulation, dissolved acidic agent can react with an amount of exposed basic agent, during processing or refrigerated storage, to produce carbon dioxide gas that can expand (e.g., proof or partially proof) the dough.

A non-developed, chemically-leavened dough composition according to the invention can include other dough ingredients as known in the dough and baking arts, or as developed in the future to be useful with chemically-leavened, non-developed dough compositions.

Certain embodiments of doughs according to the invention can also include an oxidoreductase enzyme to prevent enzymatic dough discoloration by reacting with oxygen, e.g., as explained in Applicants co-pending U.S. patent application Ser. No. 10/446,483, filed May 28, 2003, entitled METHOD OF PREVENTING DISCOLORATION OF DOUGH, DOUGH COMPOSITIONS, AND DOUGH PRODUCTS, the entire contents of which are incorporated herein by reference. Oxidoreductase enzymes are generally known, and are described, for example, at Whitaker, John R., *Principles of Enzymology for the Food Sciences*, $2^{nd}$ Ed., Chapters 21-27, p. 517 et. seq. Examples of oxidoreductase enzymes include glucose oxidase and lactate dehydrogenase, among many others. The dough composition includes a substrate such as glucose that can react with oxygen in the presence of an oxidoreductase enzyme, to consume oxygen and prevent the oxygen from being available to react to discolor the dough composition. The particular substrate and amount used can depend on various factors relating to the dough composition and packaged dough product, in particular, on the oxidoreductase enzyme that is selected.

Glucose (or any other substrate that reacts with oxygen in the presence of an oxidoreductase enzyme) can be present in a dough composition as a separately added ingredient, e.g., as a sweetener or other additive, or may be contained in one of the other ingredients included in the dough composition. The amount of the substrate in a dough composition of the invention can be any amount that in combination with an oxidoreductase enzyme (e.g., glucose oxidase) results in the depletion of oxygen within the dough composition or packaged dough product to the extent that the extent of dough discoloration (e.g., graying) is reduced or eliminated upon subsequent refrigerated or frozen storage prior to being baked. Exemplary amounts of glucose may be in the range from about 1 to about 40 percent (Baker's percent), e.g., from about 5 to about 30 Baker's percent.

An oxidoreductase enzyme such as glucose oxidase can be included in the dough composition itself, in only a portion of the dough composition such as at a surface, or elsewhere in a packaged dough composition at a location effective to inhibit or prevent discoloration. The oxidoreductase enzyme can be any enzyme that effectively causes a non-discoloring reaction between oxygen and a substrate to consume oxygen within the dough composition or packaged dough product and prevent the oxygen from otherwise reacting to cause discoloration of the dough composition. A preferred example of a useful oxidoreductase enzyme is glucose oxidase.

The amount of oxidoreductase enzyme that can be included in the dough product or the dough composition can be any amount that will be effective to react with and consume oxygen and prevent reaction of oxygen to produce discoloration of the dough composition. The particular amount used in a dough composition or dough product can depend on various factors, such as the type of dough composition and ingredients used in the dough composition, the type of dough product packaging (including the amount of headspace and the amount of oxygen in the headspace, if any), the amount of surface area of the dough product, the processing and packaging history of the dough product, the intended storage conditions of the dough composition or dough product, and how each of these and other factors affect the amount of oxygen present in a dough composition or a dough product.

Exemplary amounts of glucose oxidase as an oxidoreductase enzyme, for use in chemically leavenable dough composition packaged in a flexible package with a carbon dioxide atmosphere as described herein, can be in the range from about 0.025 glucose oxidase activity units per gram dough to about 0.25 glucose oxidase activity units per gram dough, e.g., from about 0.025 to about 0.075 glucose oxidase activity units per gram dough. Amounts of glucose oxidase ingredient, e.g., GLUZYME 2.500 BG manufactured by Novozymes, which compare to the above ranges, can be amounts in the range from about 0.001 to 0.01 weight percent GLUZYME 2500 BG based on the total weight of the dough composition.

A flour component can be any suitable flour or combination of flours, including glutenous and nonglutenous flours, and combinations thereof. The flour or flours can be whole grain flour, flour with the bran and/or germ removed, or combinations thereof. Typically, a dough composition can include between about 30 and about 55 weight percent flour, e.g., from about 35 to about 50 weight percent flour, based on the total weight of a dough composition.

Examples of liquid components include water, milk, eggs, and oil, or any combination of these, as will be understood to be useful in chemically-leavened, non-developed dough compositions. For example, a liquid component may be water (added as an ingredient and as part of other ingredients), e.g., in an amount in the range from about 15 to 35 weight percent, although amounts outside of this range may also be useful. Water may be added during processing in the form of ice, to control the dough temperature in-process; the amount of any such water used is included in the amount of liquid components. The amount of liquid components included in any particular dough composition can depend on a variety of factors including the desired moisture content and rheological properties of the dough composition. Typically, liquids can be present in a dough composition in an amount between about 15 percent by weight and about 35 percent by weight, e.g., water in an amount in the range from 25 to 35 weight percent based on total weight of a dough composition.

The dough composition can optionally include fat ingredients such as oils and shortenings. Examples of suitable oils include soybean oil, corn oil, canola oil, sunflower oil, and other vegetable oils. Examples of suitable shortenings include animal fats and hydrogenated vegetable oils. Fat may be used in an amount less than about 20 percent by weight, often in a range from 5 or 10 weight percent to 20 weight percent fat, based on total weight of a dough composition.

The dough composition can optionally include one or more sweeteners, either natural or artificial, liquid or dry. Examples of suitable dry sweeteners include lactose, sucrose, fructose, dextrose, maltose, corresponding sugar alcohols, and mixtures thereof.

One specific example of a non-developed dough that can be prepared and packaged according to the invention, is a chemically leavened biscuit dough. Such a dough may include, for example, ingredients within the following ranges: from 30 to 50 weight percent flour, from 5 to 20 weight percent fat, from 0.025 to 0.25 weight percent glucose oxidase, from 0.6 to 1.2 weight percent non-encapsulated acidic chemical leavening agent with a neutralization value of 100% (e.g., SALP) (neutralization value is the weight of soda neutralized by 100 parts leavening acid), and from 0.6 to 1.2 weight percent encapsulated basic chemical leavening agent at 75% activity (not including the weight of any encapsulant), based on the total weight of the dough composition.

Dough compositions described herein can be prepared according to methods and steps that are known in the dough and dough product arts. These can include steps of mixing or blending ingredients, folding, lapping, forming, etc., which are steps well known in the dough and baking arts. According to particular methods, wherein a dough composition includes an encapsulated basic leavening agent, a dough can be prepared by methods that prevent or avoid substantial or excessive damage to encapsulated basic chemical leavening agent particles. Methods of incorporating encapsulated basic chemical leavening agent into a dough composition can include using reduced amounts of shear, such as by using high speed or high shear mixing for a reduced amount of time, or by using a low shear method. Such methods are described in Assignee's co-pending U.S. patent application Ser. No. 10/224,886, entitled Methods of Incorporating Encapsulated Chemical Leavening Agent into Dough Ingredients, and Compositions So Prepared, filed Aug. 21, 2002, the entirety of which is incorporated herein by reference.

A dough composition, once prepared from ingredients as described, can be further processed as desired to prepare a final dough composition. Depending on the type of final dough composition, certain steps of sheeting, folding, lapping with and without shortening or fat, enrobing, cutting, filling, and shaping, can be used to form a particular shape and form of dough product.

A dough composition as described herein can be prepared, stored, and sold or used, as is typical or otherwise useful for refrigerated, developed, chemically-leavened dough compositions, and consistent with the present description. According to the invention, an unproofed, raw, chemically-leavenable dough composition can be packaged in a low-pressure package having a ratio of headspace to dough volume of no greater than 0.5 cubic centimeters headspace per gram dough. Exemplary ratios of headspace to dough volume can be in the range from 0.1 to 0.5 cubic centimeters headspace per gram of dough (e.g., at 45 degrees Fahrenheit), e.g., from 0.4 to 0.5 cubic centimeters headspace per gram. The headspace is an atmosphere of concentrated carbon dioxide, e.g., an atmosphere that contains at least 90 percent, 95 percent, or at least 99 percent carbon dioxide. This refers to the carbon dioxide as contained by the package upon closing or sealing the package, and at a processing temperature. A processing temperature may be from above freezing to about room temperature, or slightly above. Typical processing temperatures may be in the range from 35 to 50 degrees Fahrenheit, e.g., 45 degrees Fahrenheit.

Examples of low pressure or non-pressurized packaging configurations include plastic tubes, chubs, and pouches. A low pressure package can include packaging may optionally include a rigid material such as a rigid plastic tray in combination with a flexible film portion that closes or encloses the tray, optionally but not necessarily including a pressure relief valve. A low pressure, or non-pressurized container, means that the packaging is not designed to produce or maintain a pressurized interior space, e.g., an interior pressure greater than approximately 1.5 atm (absolute). The packaging material does not require a pressure relief valve.

Exemplary packaging materials that may be useful for non-pressurized pouch, tube, or chub packaging, can include flexible plastic materials that act as an adequate barrier to gases such as oxygen and carbon dioxide, to promote storage and freshness. The material of the flexible package can be any of a variety of flexible materials, generally films, useful in packaging food or dough products. Flexible refers to the ability of a packaging material to bend and change shape as described herein, and does not require the material to stretch.

Exemplary flexible packaging materials include flexible films or film-like materials such as polymeric films or flexible paper or foil materials. The flexible packaging does not need to include stiff cardboard, cardboard cans, or other non-flexible materials. Exemplary flexible film materials can be continuous single or multi-layer films that are flexible and impermeable to gases such as oxygen, carbon dioxide, water vapor, or combinations of these. A substantially air tight flexible packaging can be prepared from materials such as paper or polymeric materials or foils, with especially preferred materials including multi-layer polymeric (e.g., plastic) films. A polymeric film may be prepared from generally well known packaging material polymers such as different polyesters (e.g., PET), nylons, polyolefins (e.g., polyethylene), vinyls, polyalcohols, etc.

According to certain embodiments of the invention, the dough composition can be packaged in an unproofed condition, and can experience a certain amount of leavening (e.g., partially proofing) while packaged, e.g., during refrigerated storage. As a specific example, an unproofed dough composition, e.g., having a raw specific volume in the range from 0.9 to 1.2 cc/g can be placed in a flexible package containing headspace and added carbon dioxide atmosphere as described, i.e., wherein the amount of headspace and added carbon dioxide is less than 0.5 cubic centimeters carbon dioxide per gram of dough in a package. During refrigerated storage, the unproofed dough composition can experience an amount of leavening (e.g., proofing) while inside the package, to result in a raw specific volume of a partially-proofed dough composition, e.g., from 1.2 to 1.7 cc/g. This leavening occurs due to reaction between the soluble acidic agent with the basic chemical leavening agent—dissolved acid can react with an amount of basic agent that is exposed to the acid due to imperfect encapsulation. An additional amount of expansion of the dough also occurs as the result of the added carbon dioxide in the headspace, which diffuses into the dough from the headspace and is subsequently released into the dough gas cells.

According to methods of the invention, the dough composition can be packaged in a low pressure package to include an amount of headspace, as described herein, and the headspace can be flushed with concentrated carbon dioxide, e.g., at least 90 percent carbon dioxide. Advantageously, the dough can be placed in the package, and the package can be flushed with carbon dioxide, without having the dough at a frozen temperature (as is sometimes done when vacuum is applied to remove headspace). For example, the dough may be at any processing temperature, such as from about freezing, e.g., 32 degrees Fahrenheit, to room temperature or above. A temperature that is in the range of a useful processing or refrigeration temperature may be particularly useful, e.g., a temperature in the range from 60 to 70 degrees Fahrenheit.

Optionally, an amount of vacuum may be used to remove a portion of headspace from the package. If so, a cooler dough may be more tolerant to exposure to vacuum. Vacuum, for example, may be used to reduce headspace volume and the amount of carbon dioxide to which the packaged dough is exposed, which means less carbon dioxide will be absorbed by the dough and the dough will experience a reduced amount of expansion over shelf life time, which may provide desired stability and performance. As a specific example, a dough composition cooled to approximately 40° F. can be exposed to a vacuum of up to approximately ⅔ atmosphere (335 mb).

A packaged dough product containing carbon dioxide headspace at less than 0.5 cubic centimeters for each gram of dough (upon packaging) can be stored at refrigerated temperatures, and is stable for multiple weeks. In general, an amount of carbon dioxide headspace that exceeds 0.5 cc per gram of dough (at packaging) can produce an amount of expansion during refrigerated storage that is undesirably high. When expansion is too great, the dough can become malformed and may not bake to a desired shape. Limiting the amount of carbon dioxide in the package headspace has been found to control (e.g., minimize) the extent of undesired expansion and deformation over refrigerated storage.

Somewhat more specifically, exemplary dough compositions when packaged according to the invention, with added $CO_2$ in the package headspace not to exceed 0.5 cc/gm dough, can evolve less than 40 cubic centimeters (cc) of carbon dioxide per 125 grams of dough over an 8, 10, or 12 week period of time while stored at 45 degrees Fahrenheit, e.g., from 30 to 40 cc of carbon dioxide per 125 grams over 8, 10, or 12 weeks at 45° F. Such a dough can undergo a desired amount of leavening during such period of refrigerated storage, to produce a dough composition having a raw specific volume in the range from 0.9 to 1.6 cc/gram.

Upon baking, exemplary non-developed dough compositions of the invention can exhibit leavening and baked specific volume properties that are typical of normal non-developed doughs, e.g., can be baked to a specific volume of at least 2 or 2.5 cc/g, e.g., from 2.5 to 3.4 cc/g.

Exemplary embodiments of the invention are described herein. Variations on the exemplary embodiments will become apparent to those of skill in the relevant arts upon reading this description. The inventors expect those of skill to use such variations as appropriate, and intend for the invention to be practiced otherwise than specifically described herein. Accordingly, the invention includes all modifications and equivalents of the subject matter recited in the claims as permitted by applicable law. Moreover, any combination of the above-described elements in all possible variations thereof is encompassed by the invention unless otherwise indicated.

The invention claimed is:

1. A packaged refrigerated dough product comprising:
   an unproofed, raw, chemically-leavenable non-developed dough composition, the dough composition including a basic chemical leavening agent, an acidic chemical leavening agent, and an oxidoreductase enzyme; and
   a package containing the dough composition and a carbon-dioxide-flushed headspace containing at least 90 percent carbon dioxide with a ratio of headspace volume to dough volume less than or equal to 0.5 cubic centimeters per gram, wherein the packaged refrigerated dough product is capable of being stored for 40 days at 45 degrees Fahrenheit, during which storage the dough composition has a raw specific volume of 0.9 to 1.7 cubic centimeters per gram.

2. The product of claim 1 wherein the dough product is at a temperature in the range from 35 to 50 degrees Fahrenheit.

3. The product of claim 1 wherein the dough composition comprises from 0.025 to 0.25 oxidoreductase enzyme units per gm dough.

4. The product of claim 1 comprising acidic chemical leavening agent selected from the group consisting of non-encapsulated sodium aluminum phosphate, non-encapsulated sodium acid pyrophosphate, and combinations thereof.

5. The product of claim 1 wherein the dough is a non-developed dough comprising:
   from 35 to 50 weight percent flour,
   from 5 to 20 weight percent fat,
   from 0.025 to 0.25 weight percent oxidoreductase enzyme,
   from 0.6 to 1.2 weight percent non-encapsulated acidic chemical leavening agent, and
   from 0.6 to 1.2 weight percent encapsulated basic chemical leavening agent, based on the total weight of the dough composition.

6. The product of claim 1 wherein the carbon dioxide atmosphere comprises at least 95 percent carbon dioxide.

7. The product of claim 1 wherein the packaged refrigerated dough product is capable of being stored for 40 days at 45 degrees Fahrenheit, during which storage an interior pressure of the package does not exceed 1.5 atmosphere (absolute).

8. The product of claim 7 wherein the package is a thermally-formed pouch.

9. The product of claim 7 wherein the package is a flexible chub or pouch package that does not include a pressure release valve.

10. The product of claim 1 wherein the concentration of carbon dioxide in the headspace is sufficient to allow carbon dioxide of the headspace to diffuse into the dough from the headspace during the refrigerated storage.

11. The product of claim 1 wherein the packaged refrigerated dough product is capable of being stored for 40 days at 45 degrees Fahrenheit, during which storage the dough composition has a raw specific volume in a range from 1.2 to 1.5 cubic centimeters per gram.

12. The product of claim 1 wherein the ratio of headspace volume to dough volume is less than or equal to 0.1 cubic centimeters per gram.

13. A method of providing a dough product, the method comprising
providing an unproofed, non-frozen, raw, chemically-leavenable non-developed dough composition including a basic chemical leavening agent, an acidic chemical leavening agent, and an oxidoreductase enzyme,
placing the dough composition in a package, the package having a ratio of headspace volume to dough mass of no greater than 0.5 cubic centimeters headspace per gram,
flushing the headspace with carbon dioxide, and
sealing the package to contain the dough composition in the package, wherein the headspace contains at least 90 percent carbon dioxide, wherein the refrigerated dough product is capable of being packaged for 40 days of refrigerated storage at 45 degrees Fahrenheit, during which the dough composition has a raw specific volume in the range of from 0.95 to 1.7 cubic centimeters per gram.

14. The method of claim 13 wherein the dough composition comprises an acidic chemical leavening agent selected from the group consisting of non-encapsulated sodium aluminum phosphate, non-encapsulated sodium acid pyrophosphate, and combinations thereof.

15. The method of claim 13 further comprising sealing the package to contain from 0.1 to 0.5 cubic centimeters carbon dioxide per gram of dough at about 1 atmosphere and a temperature of 35 to 50 degrees Fahrenheit.

16. The method of claim 13 further comprising sealing the package to contain from 0.4 to 0.5 cubic centimeters carbon dioxide per gram of dough at about 1 atmosphere and a temperature of 35 to 50 degrees Fahrenheit.

17. The method of claim 13 wherein after 40 days of refrigerated storage at 45 degrees Fahrenheit, the dough composition has a raw specific volume in the range of from 0.95 to 1.5 cubic centimeters per gram.

18. The method of claim 13 wherein after 40 days of refrigerated storage:
the dough composition has a raw specific volume in the range from 0.95 to 1.5 cubic centimeters per gram, and
the dough composition can be baked to a baked specific volume in the range from 2.5 to 3.4 cubic centimeters per gram.

19. The method of claim 13 further comprising subjecting the package, containing the non-frozen raw dough composition, to vacuum.

20. The method of claim 13 wherein the dough is a non-developed dough comprising:
from 35 to 50 weight percent flour,
from 5 to 20 weight percent fat,
from 0.025 to 0.25 weight percent oxidoreductase enzyme,
from 0.6 to 1.2 weight percent non-encapsulated acidic chemical leavening agent, and
from 0.6 to 1.2 weight percent encapsulated basic chemical leavening agent, based on the total weight of the dough composition.

21. The method of claim 13 wherein the concentration of carbon dioxide in the headspace is sufficient to allow carbon dioxide of the headspace to diffuse into the dough from the headspace during the refrigerated storage.

22. The method of claim 13 wherein the ratio of headspace volume to dough volume is less than or equal to 0.1 cubic centimeters per gram.

* * * * *